United States Patent
Seguin (10) Patent No.: US 7,206,645 B2
(45) Date of Patent: Apr. 17, 2007

(54) MOBILE, UNITARY, WALL-PLUGGED, TEMPERATURE AND/OR POWER MONITORING AND WARNING SYSTEM FOR CRITICAL SPACES

(76) Inventor: Thomas J. Seguin, 29 Old Oyster Rd., Cotuit, MA (US) 02635

( * ) Notice: Subject to any disclaimer, the term of this patent is extended or adjusted under 35 U.S.C. 154(b) by 110 days.

(21) Appl. No.: 11/213,413

(22) Filed: Aug. 26, 2005

(65) Prior Publication Data

US 2006/0079969 A1    Apr. 13, 2006

Related U.S. Application Data (60) Provisional application No. 60/611,548, filed on Sep. 20, 2004, provisional application No. 60/632,283, filed on Dec. 2, 2004.

(51) Int. Cl.
| | |
|---|---|
| G05B 9/02 | (2006.01) |
| G01M 1/38 | (2006.01) |
| G05B 13/00 | (2006.01) |
| G05D 23/00 | (2006.01) |
| G08B 21/00 | (2006.01) |

(52) U.S. Cl. .............. 700/80; 700/78; 700/79; 700/276; 700/277; 702/185; 702/188; 340/635; 340/654; 340/540; 340/541; 340/531; 340/539.18; 340/426.18; 340/426.2

(58) Field of Classification Search ........... 700/21, 700/78, 79, 80, 83, 17, 276, 277, 278; 702/188, 702/182–184, 185; 340/635, 637, 654, 426.18, 340/426.2, 540–541, 539.18, 531
See application file for complete search history.

(56) References Cited

U.S. PATENT DOCUMENTS

| | | | | |
|---|---|---|---|---|
| 6,553,336 | B1 * | 4/2003 | Johnson et al. ............. | 702/188 |
| 6,993,417 | B2 * | 1/2006 | Osann, Jr. .................. | 700/291 |
| 7,068,184 | B2 * | 6/2006 | Yee et al. ............. | 340/870.05 |
| 7,113,090 | B1 * | 9/2006 | Saylor et al. .......... | 340/539.18 |
| 7,116,247 | B2 * | 10/2006 | Fujiwara et al. ......... | 340/932.2 |
| 2003/0078029 | A1 * | 4/2003 | Petite ......................... | 455/404 |
| 2004/0113770 | A1 * | 6/2004 | Falk et al. .................. | 340/531 |
| 2005/0104575 | A1 * | 5/2005 | Yee et al. ................. | 324/76.11 |
| 2005/0144502 | A1 * | 6/2005 | Gandhi et al. ................. | 714/4 |
| 2005/0253706 | A1 * | 11/2005 | Spoltore et al. ....... | 340/539.14 |

* cited by examiner

*Primary Examiner*—Ramesh Patel
(74) *Attorney, Agent, or Firm*—John P. McGonagle (57) ABSTRACT

A system comprising a housing, an electrical bus, a connector module for connecting the electrical bus to a power source, a battery module so as to provide power to the electrical bus when the power source is not supplying power to the electrical bus, a sensor module for monitoring temperature and utility power status with respect to the space and detecting an alarm condition, a user interface module for permitting a user to (i) store at least one telephone number, and (ii) store the current location of the system, and a cellular telephone module configured to (i) place a cellular telephone call to a stored telephone number when the alarm condition is detected by a sensor, and (ii) advise the call recipient of the current location of the system.

27 Claims, 9 Drawing Sheets

GENERAL DEVICE SCHEMATIC

BASE SYSTEM - HARDWARE / SOFTWARE / FIRMWARE CONFIGURATION

FIG.3

VOLTAGE LEVEL MONITORING SYSTEM - HARDWARE / SOFTWARE / FIRMWARE CONFIGURATION

FIG.4

BASE MONITORING SYSTEM WITH INTRUSION DETECTOR HARDWARE / SOFTWARE / FIRMWARE CONFIGURATION

FIG.5

BASE MONITORING SYSTEM WITH INTRUSION DETECTOR AND CAMERA HARDWARE / SOFTWARE / FIRMWARE CONFIGURATION

FIG.6

BASE MONITORING SYSTEM WITH WIRELESS DETECTORS, SENSORS OR TRANSDUCERS AND HARDWARE / SOFTWARE / FIRMWARE CONFIGURATION

FIG.7

BASE MONITORING SYSTEM WITH HARD WIRED DETECTORS, SENSORS OR
TRANSDUCERS AND HARDWARE / SOFTWARE / FIRMWARE CONFIGURATION

FIG.8

BASE SYSTEM - HARDWARE / SOFTWARE / FIRMWARE CONFIGURATION WITH ULTRASONIC RODENT REPELLENT TRANSMITTER

FIG.9

MOBILE, UNITARY, WALL-PLUGGED, TEMPERATURE AND/OR POWER MONITORING AND WARNING SYSTEM FOR CRITICAL SPACES

REFERENCES TO PENDING PRIOR PATENT APPLICATIONS

This patent application claims benefit of:

(i) pending prior U.S. Provisional Patent Application Ser. No. 60/611,548, filed Sep. 20, 2004 by Thomas J. Seguin for MOBILE UNITARY TEMPERATURE AND POWER MONITORING WARNING SYSTEM FOR CRITICAL SPACES; and (ii) pending prior U.S. Provisional Patent Application Ser. No. 60/632,283, filed Dec. 2, 2004 by Thomas J. Seguin for REMOTE HOME MONITORING SYSTEM.

The above-identified patent applications are hereby incorporated herein by reference.

FIELD OF THE INVENTION

This invention relates to monitoring and warning systems in general, and more particularly to systems for monitoring indoor spaces and warning when specific conditions are detected.

BACKGROUND OF THE INVENTION

In many cases, indoor spaces must be monitored for the occurrence of specific conditions and, when such conditions are detected, a warning must be issued. By way of example but not limitation, it can be desirable to monitor temperature within an interior space, and/or to monitor for the presence or absence of utility power voltage, etc.

SUMMARY OF THE INVENTION

The present invention provides a novel system for monitoring critical indoor spaces and issuing a warning when specific conditions are detected.

More particularly, in one preferred embodiment, the present invention provides a unitary, wall-plugged mobile unit, preferably about hand-held calculator size, equipped with mobile telephone circuitry and with circuitry for measuring space temperature and the presence or absence of utility power voltage. The system is preferably user-programmed with high and low temperature setpoints, and permanently programmed with a voltage loss alarm, and is configured so that a call is automatically made to a user-programmed telephone number (or to a list of user-programmed telephone numbers) if the temperature varies beyond the high and low temperature setpoints, and/or if utility power is lost.

In another form of the invention, there is provided a novel system for monitoring temperature and utility power status with respect to a space and alerting a user when an alarm condition occurs, the system comprising:

a housing;
an electrical bus attached to the housing;
a connector module attached to the housing for connecting the electrical bus to a power source;
a battery module attached to the housing and connected to the electrical bus so as to provide power to the electrical bus when the power source is not supplying power to the electrical bus;
a sensor module attached to the housing and powered from the electrical bus for monitoring temperature and utility power status with respect to the space and detecting an alarm condition;
a user interface module attached to the housing and powered from the electrical bus for permitting a user to (i) store at least one telephone number, and (ii) store the current location of the system; and
a cellular telephone module attached to the housing and powered from the electrical bus and configured to (i) place a cellular telephone call to a stored telephone number when the alarm condition is detected by a sensor, and (ii) advise the call recipient of the current location of the system.

In another form of the invention, there is provided a method for monitoring temperature and utility power status with respect to a space and alerting a user when an alarm condition occurs, the method comprising:

providing a system comprising:
a housing;
an electrical bus attached to the housing;
a connector module attached to the housing for connecting the electrical bus to a power source;
a battery module attached to the housing and connected to the electrical bus so as to provide power to the electrical bus when the power source is not supplying power to the electrical bus;
a sensor module attached to the housing and powered from the electrical bus for monitoring temperature and utility power status with respect to the space and detecting an alarm condition;
a user interface module attached to the housing and powered from the electrical bus for permitting a user to (i) store at least one telephone number, and (ii) store the current location of the system; and
a cellular telephone module attached to the housing and powered from the electrical bus and configured to (i) place a cellular telephone call to a stored telephone number when the alarm condition is detected by a sensor, and (ii) advise the call recipient of the current location of the system;
connecting the connector module to a power source; and
using the user interface module to store a telephone number, and using the user interface module to store the current location of the system.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Basic System

Figure 1:
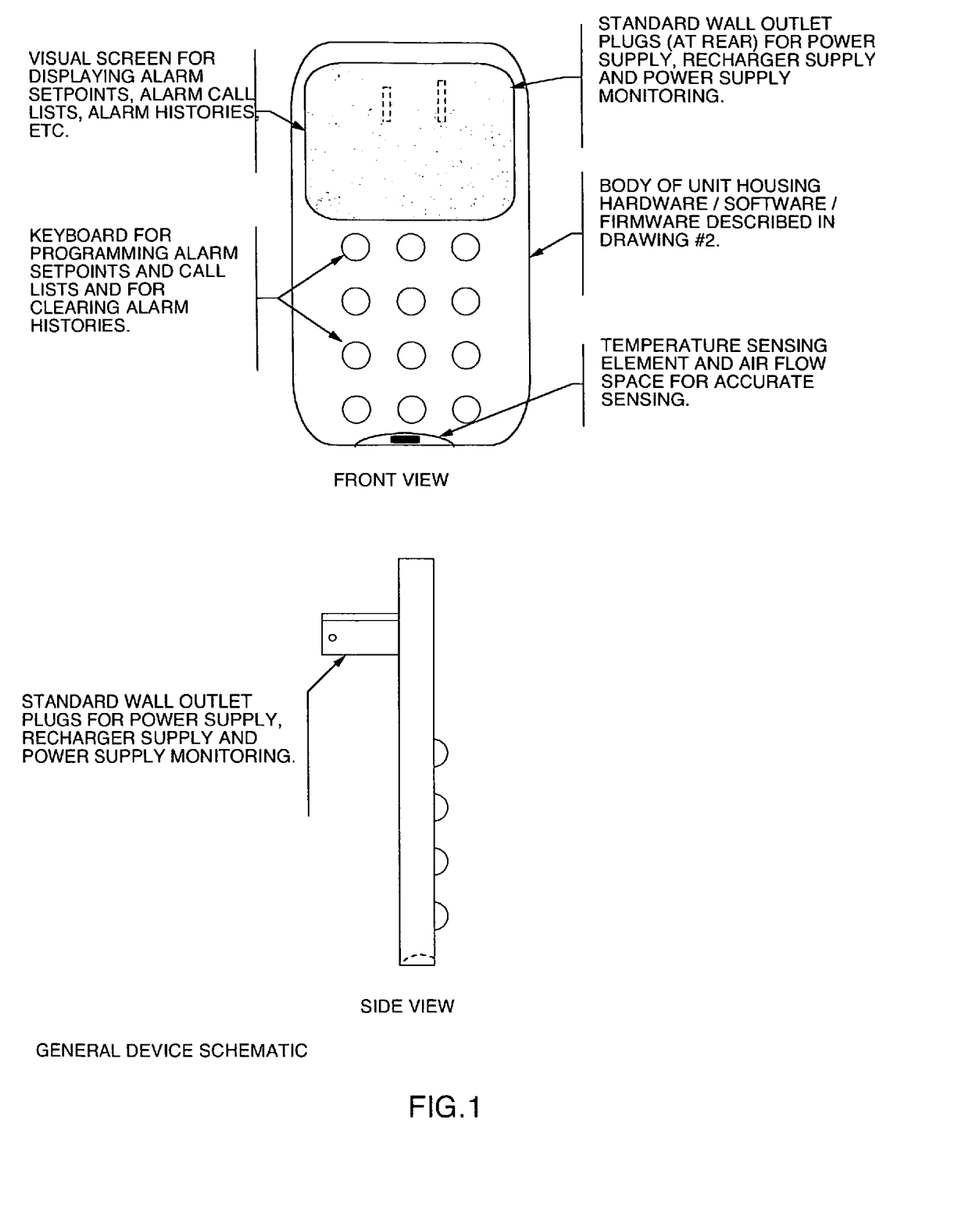
FIG. 1 is a schematic diagram showing one preferred form of a system formed in accordance with the present invention.
Figure 2:
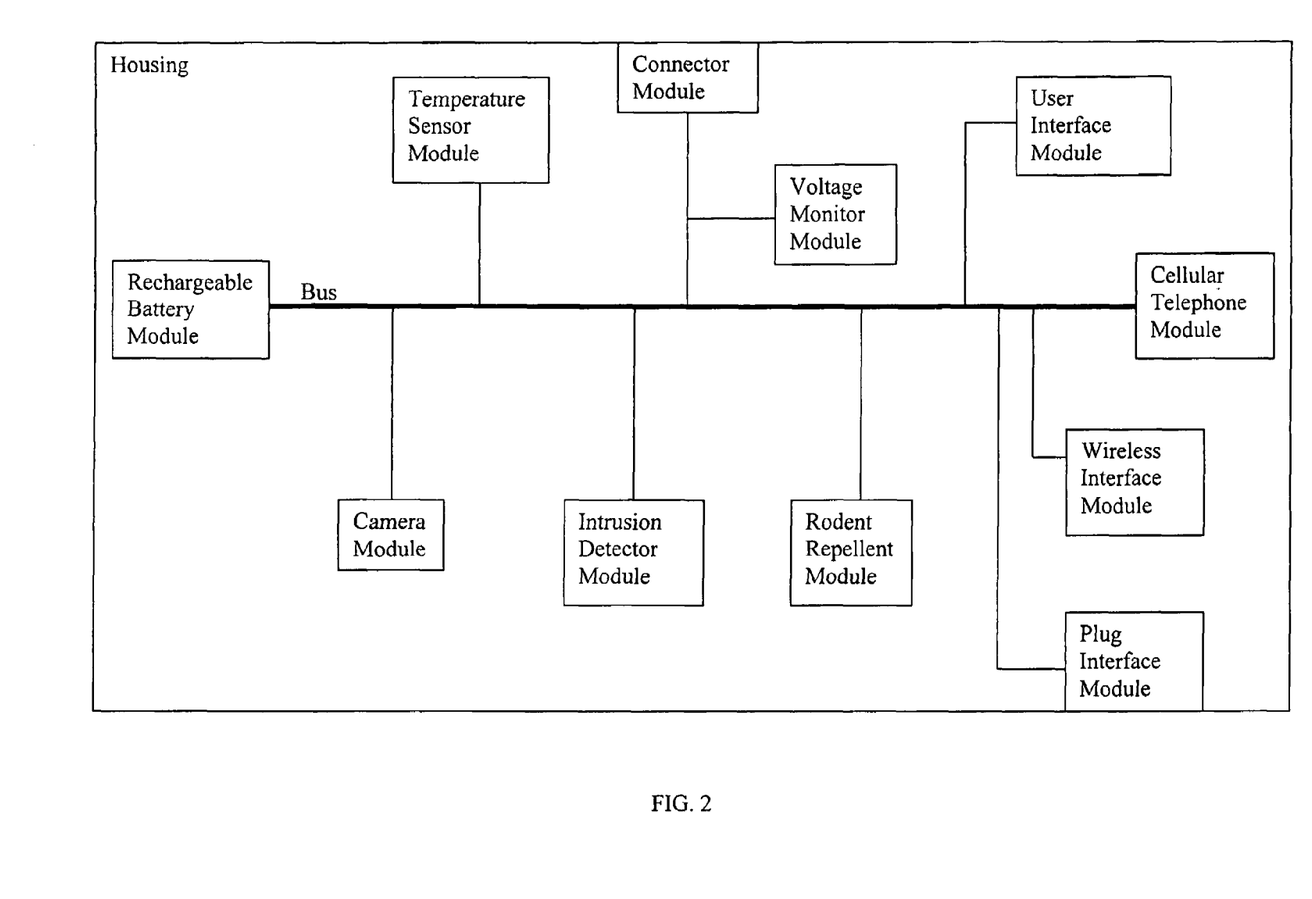
FIG. 2 is a schematic diagram showing one preferred form of a system in block diagram form.
Figure 3:
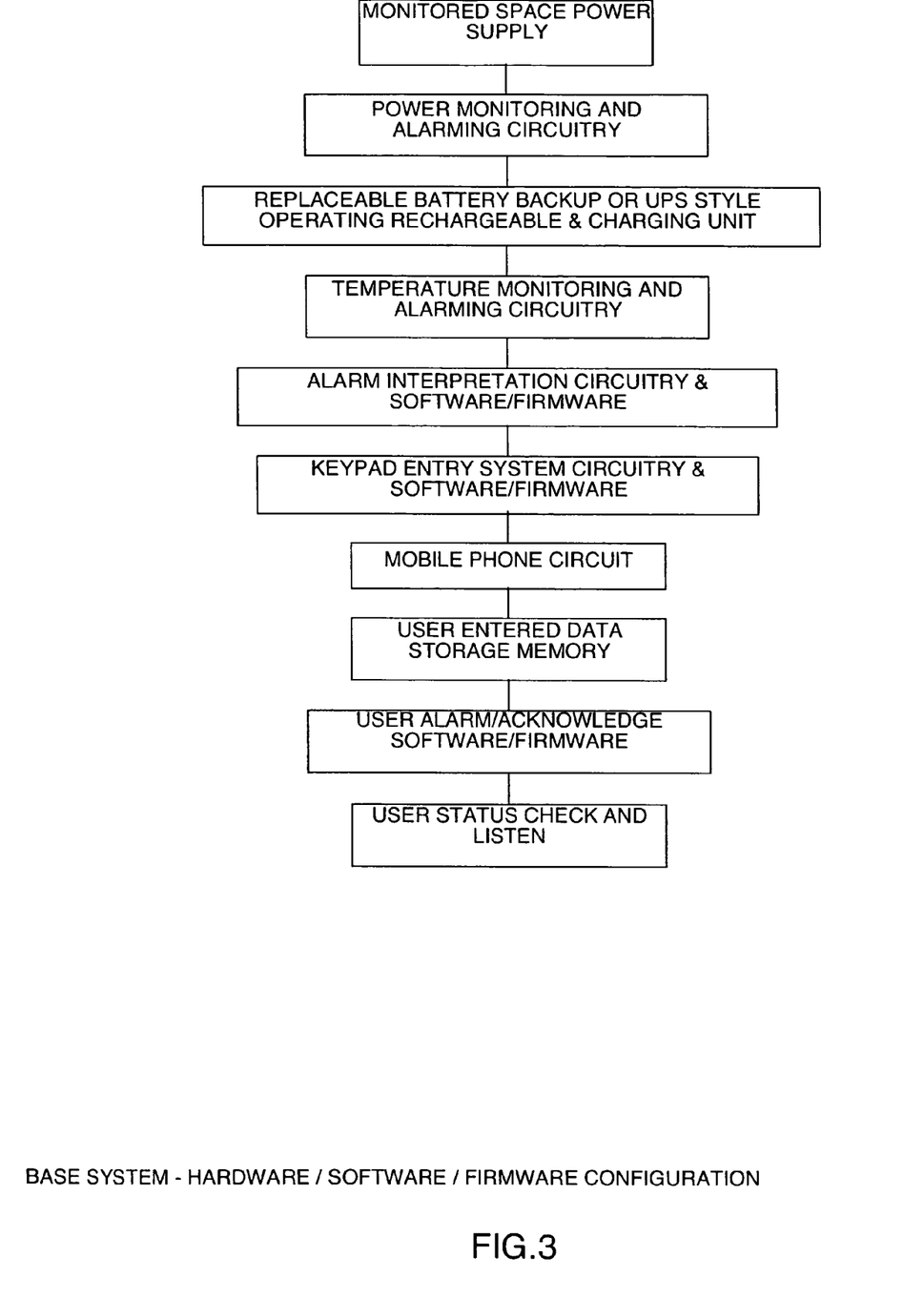
FIG. 3 is a schematic diagram showing the preferred hardware, software and firmware configuration of the basic system.

Looking first at FIGS. 1–3, an objective of the present invention is to inexpensively protect unattended facilities (and the contents thereof) from damage resulting from temperature fluctuations and/or loss of power. By way of example but not limitation, typical users of the novel system might include the following:

(i) those responsible for the proper functioning of data processing and/or computer network rooms where fluctuations in temperature and/or power loss can result in significant financial loss through lost data and/or damaged equipment;

(ii) greenhouse operators in intemperate climates where the loss of heating and/or pumping capability can result in significant crop loss within hours;

(iii) those with vacant homes (including vacation homes), laboratories and critical storage spaces (e.g., those containing explosives, corrosives, etc.);

(iv) businesses where the cold storage of food and/or other temperature-sensitive items (e.g., pharmaceuticals) are involved; and/or (v) those responsible for buildings with sprinklers.

In all of these situations, it is very useful to have a system to inexpensively and efficiently protect the facilities and their contents from damage resulting from temperature fluctuations and/or loss of power.

The present invention comprises a novel system for monitoring temperature and utility power status with respect to a space and alerting a user when an alarm condition occurs. The novel system comprises:

a housing;

an electrical bus attached to the housing;

a connector module attached to the housing for connecting the electrical bus to a power source;

a battery module attached to the housing and connected to the electrical bus so as to provide power to the electrical bus when the power source is not supplying power to the electrical bus;

a sensor module attached to the housing and powered from the electrical bus for monitoring temperature and utility power status with respect to the space and detecting an alarm condition;

a user interface module attached to the housing and powered from the electrical bus for permitting a user to (i) store at least one telephone number, and (ii) store the current location of the system; and a cellular telephone module attached to the housing and powered from the electrical bus and configured to (i) place a cellular telephone call to a stored telephone number when the alarm condition is detected by a sensor, and (ii) advise the call recipient of the current location of the system.

In one preferred form of the invention, the at least one sensor module is adapted to detect when a temperature parameter is outside of a range, or when a voltage parameter is outside of a range, or both.

In other preferred forms of the invention, the at least one sensor module is adapted to monitor other conditions (e.g., pressure, smoke, humidity, free water, gases, etc.).

And in one preferred form of the invention, the user-interface module is adapted to allow a user to set the sensor ranges (e.g., temperature range, voltage range, etc.).

The system is configured so that it may be moved as a unit to a given location, and then the user interface used to store the current location of the system. Thereafter, when an alarm condition is detected, the cellular telephone module automatically contacts at least one number of those on a user-programmed call list and informs the call recipient of the programmed location of the monitored space and, preferably, the temperature or voltage parameter that is out of range. The call recipient may be notified of the alarm condition by a voice message, a text massage, an E-mail, etc.

As an example, if a tree falls and cuts off power to an unoccupied northern vacation home during the winter, the power to the device would fail, causing the device to revert to battery backup, phone the first number on the call list and voice message or text message the location and the fact that the power has failed. As the space cools (i.e., no power and no heat) to the user preset alarm temperature, the cellular telephone module will make another call to inform a call recipient that the low temperature threshold has been reached.

In one preferred form of the invention, when the system senses that a problem exists or may be developing, the system sends an alert report and, preferably, also continues to send periodic (e.g., hourly) report updates until the alert condition no longer exists.

In another preferred form of the invention, the system is configured to require acknowledgment from the call recipient of the receipt of the alarm warning by a return phone call back to the system within a preprogrammed time period, or the system will automatically call the next phone number on the list, with this process continuing until all the numbers on the list have been notified. When this occurs, the system then repeats the process, starting again at the top of the telephone list.

In one preferred form of the present invention, the system sends alert messages to designated professionals who are on call for remedial action, e.g., plumbers, heating/oil/propane companies, property managers, police and fire departments, etc.

If desired, the system may be remotely activated or deactivated by preset instructions effected through password or other means, and/or the system may be remotely polled for current site conditions.

Preferably, the system is also able to call a user-programmed number on a periodic basis (e.g., daily, weekly, etc.) and inform the call recipient of the current operational status of the system, and/or provide information about the current conditions of the space being monitored (i.e., temperature, humidity, etc.).

This system is designed to be plugged into a wall outlet and be programmed with a phone list of people to be notified if a parameter is exceeded. The system also has a battery that is able to operate the sensors, system logic and cellular telephone system if utility power is lost, and preferably the battery is recharged by power from the power plug. The system is programmable at least to the extent that it holds alarm trigger values, contacts dial-up phone numbers to be alerted on the detection of alarm conditions, and is able to be activated, deactivated and/or polled for current conditions remotely by authorized operators.

System with Voltage Monitor Module

Figure 4:
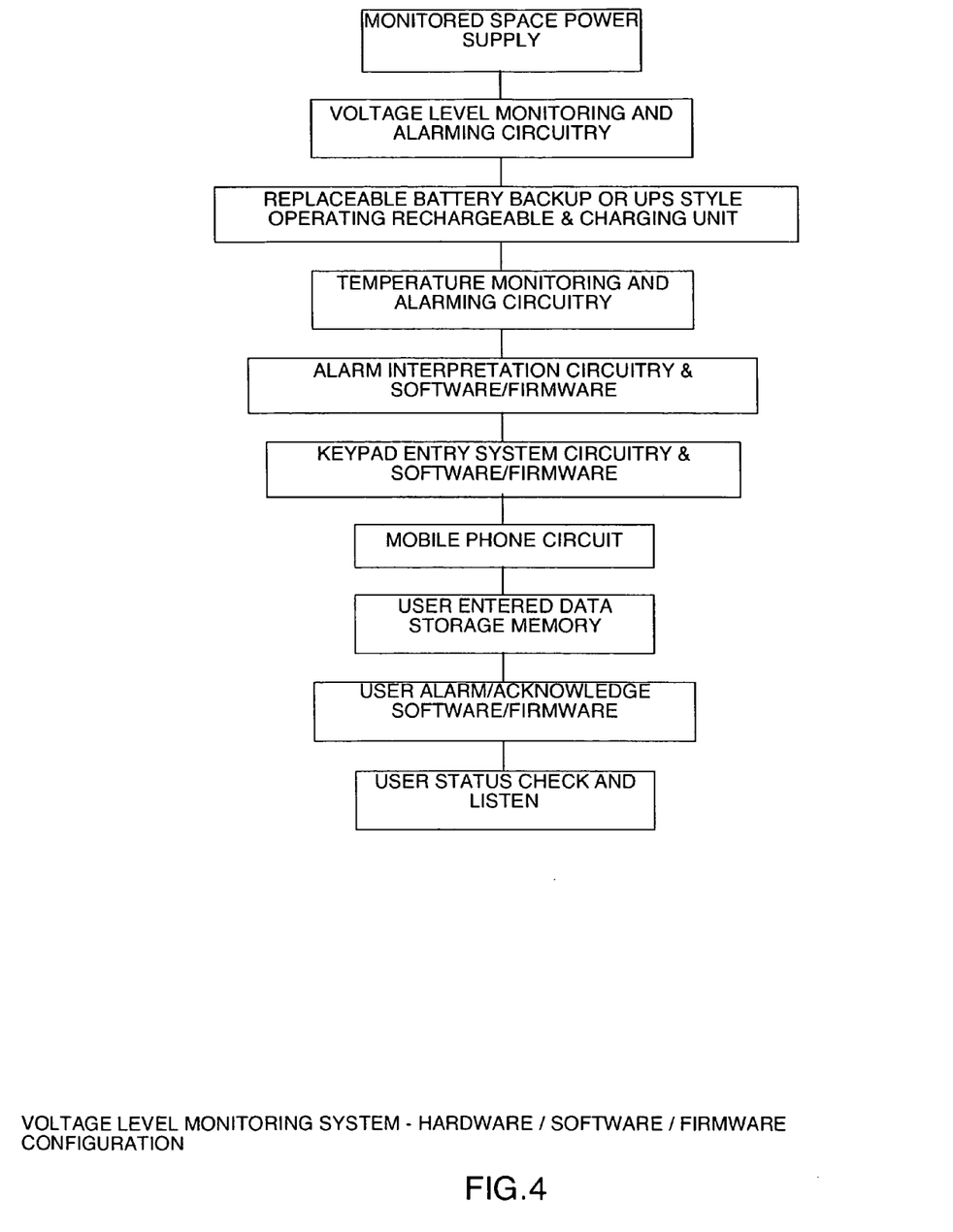
FIG. 4 is a schematic diagram showing the preferred hardware, software and firmware configuration for the basic system with a voltage level monitoring module.

Looking next at FIGS. 2 and 4, in another embodiment of the system, actual voltage is measured and voltage fluctuations are reported according to user-set parameters. This embodiment is useful for monitoring spaces where a rise or fall in utility voltage could damage power-consuming equipment. As an example, the unit may set off an alarm if the voltage falls below 105 volts or rises above 125 volts.

System with Motion Detector Module

Figure 5:
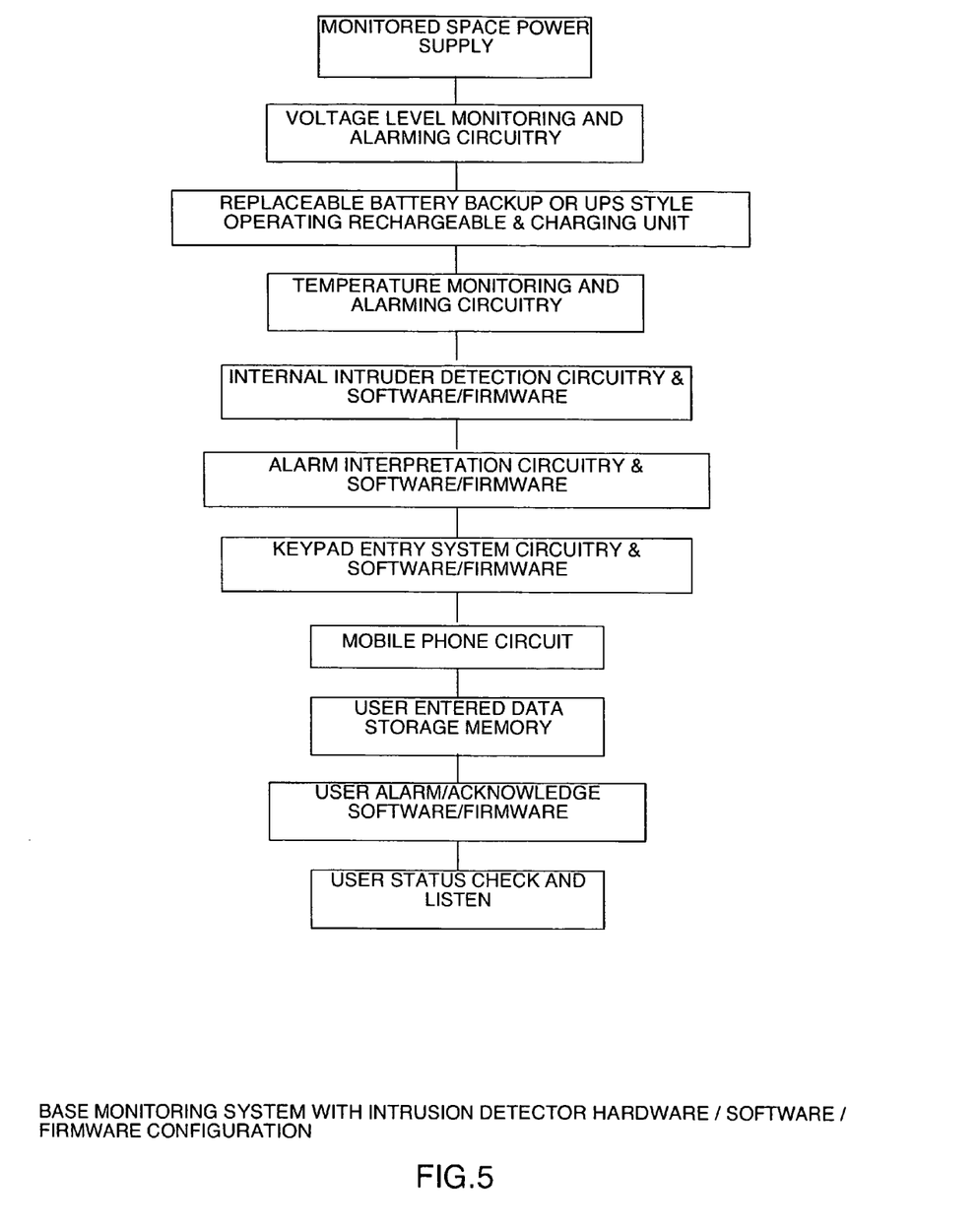
FIG. 5 is a schematic diagram showing the preferred hardware, software and firmware configuration for the basic system with an intrusion detector module.

Looking next at FIGS. 2 and 5, in another embodiment of the system, the system may be equipped with an motion detector and report the occurrence of an intrusion into the monitored space.

Another application of the present invention is its use to monitor elderly persons who live alone. In this case, the present invention is outfitted with one or more motion detectors. When motion is detected, it may be reported to family members or other care givers as an indication that the elderly person is "up and around". To avoid excessive reports, the invention may be programed to report motion periodically, e.g., once in the morning and once in the evening. A typical embodiment for this application includes the basic setup for temperature and voltage monitoring with the addition of a motion sensor.

System with Intrusion Detector Module and Camera Module

Figure 6:
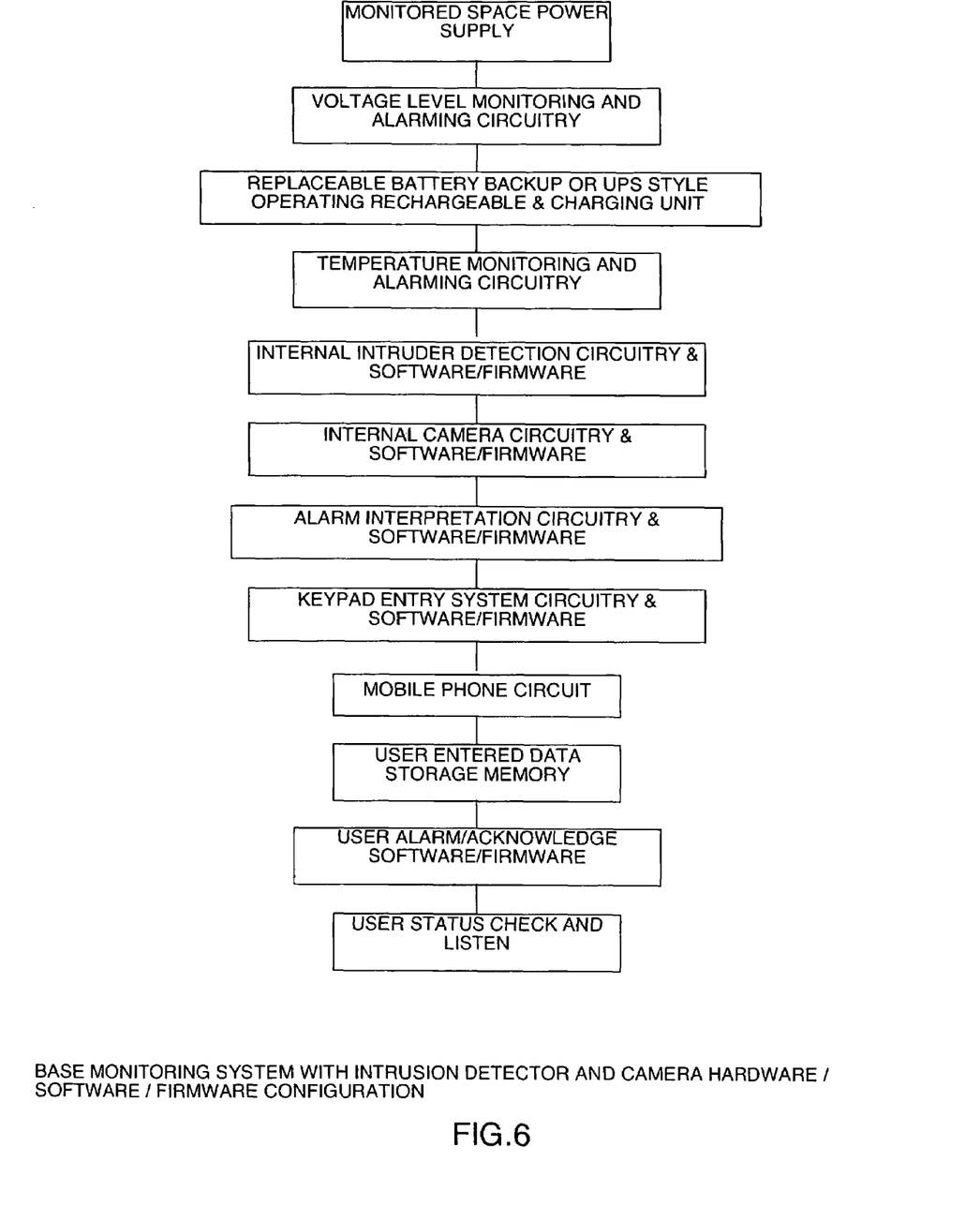
FIG. 6 is a schematic diagram showing the preferred hardware, software and firmware configuration for the basic system with an intrusion detector module and a camera module.

Looking next at FIGS. 2 and 6, in another embodiment of the system, the system is equipped with an intrusion detector (e.g., motion sensor, door or window closure sensor, etc.) and a camera that is activated by the intrusion detector so as to take still or motion pictures while an intrusion is occurring in the protected space.

System with Wireless Detectors, Sensors or Transducers

Figure 7:
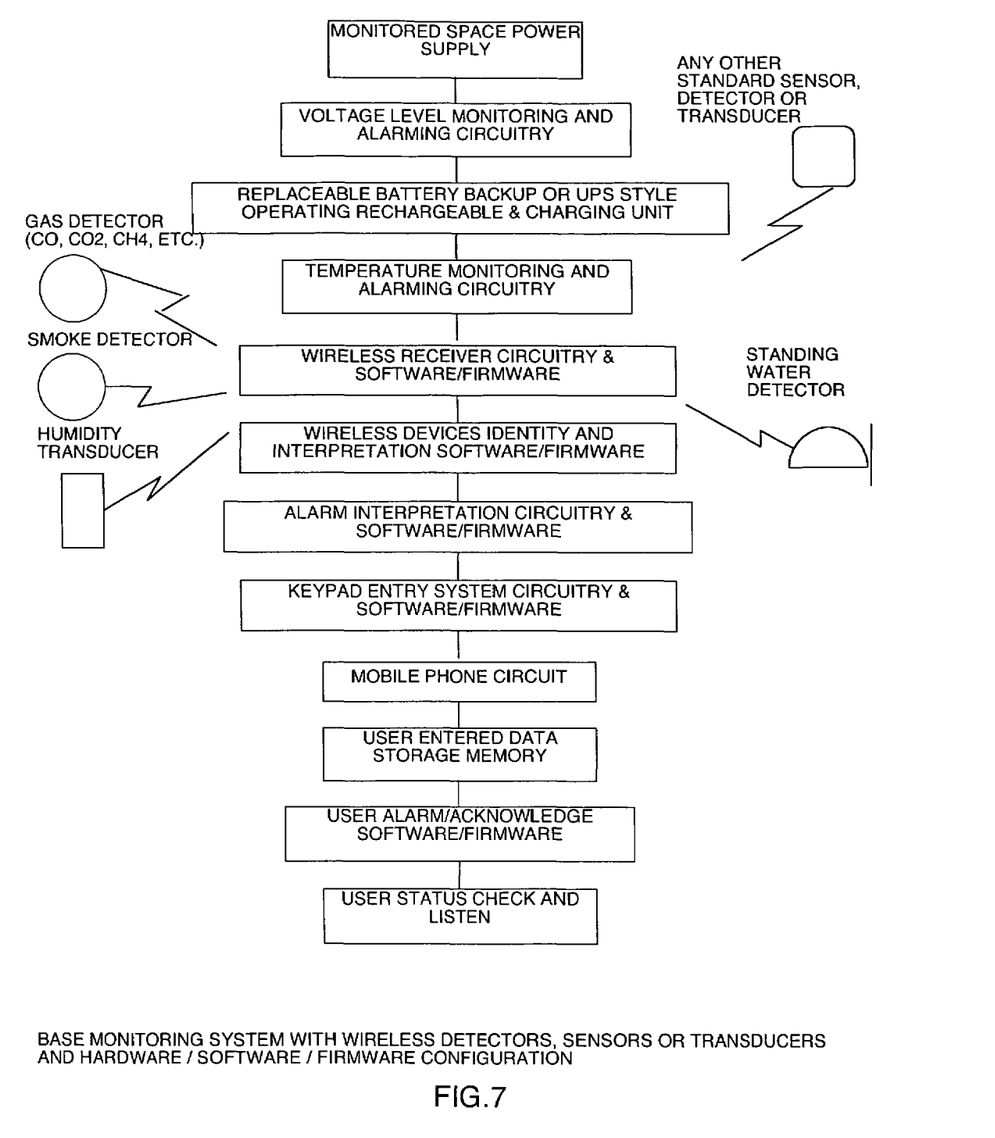
FIG. 7 is a schematic diagram showing the preferred hardware, software and firmware configuration for the basic system with wireless detectors, sensors and/or transducers.

Looking next at FIGS. 2 and 7, in another embodiment of the system, wireless-transmitting remote sensor modules (e.g., temperature, pressure, smoke, humidity, free water, gas sensing, etc.) transmit data to a wireless receiver located on the device and trigger alarm conditions in the same manner as the built-in temperature and power sensors discussed above. The data may be encoded for transmission through the wireless system or through the cellular phone module.

In one preferred form of the invention, the wireless-transmitting remote sensor module (e.g., satellite system, "BLUETOOTH" technology, etc.) is a much simplified version of the base system, wherein the satellite system remotely communicates with the base system. The wireless-transmitting remote sensor module preferably comprises:

a housing;

an electrical bus attached to the housing;

a connector module attached to the housing for connecting the electrical bus to a power source;

a battery module attached to the housing and connected to the electrical bus so as to provide power to the electrical bus when the power source is not supplying power to the electrical bus;

at least one sensor module in communication with the housing for detecting an alarm condition; and a transmitter adapted for wireless transmission of data to the base system.

In one preferred form of the invention, the at least one sensor module is attached to the housing and powered from the electrical bus.

In another form of the present invention, the at least one sensor module is in remote communication with the housing and powered by an a source other than the electrical bus, e.g., a battery.

System with Hard-Wired Detectors, Sensors or Transducers

Figure 8:
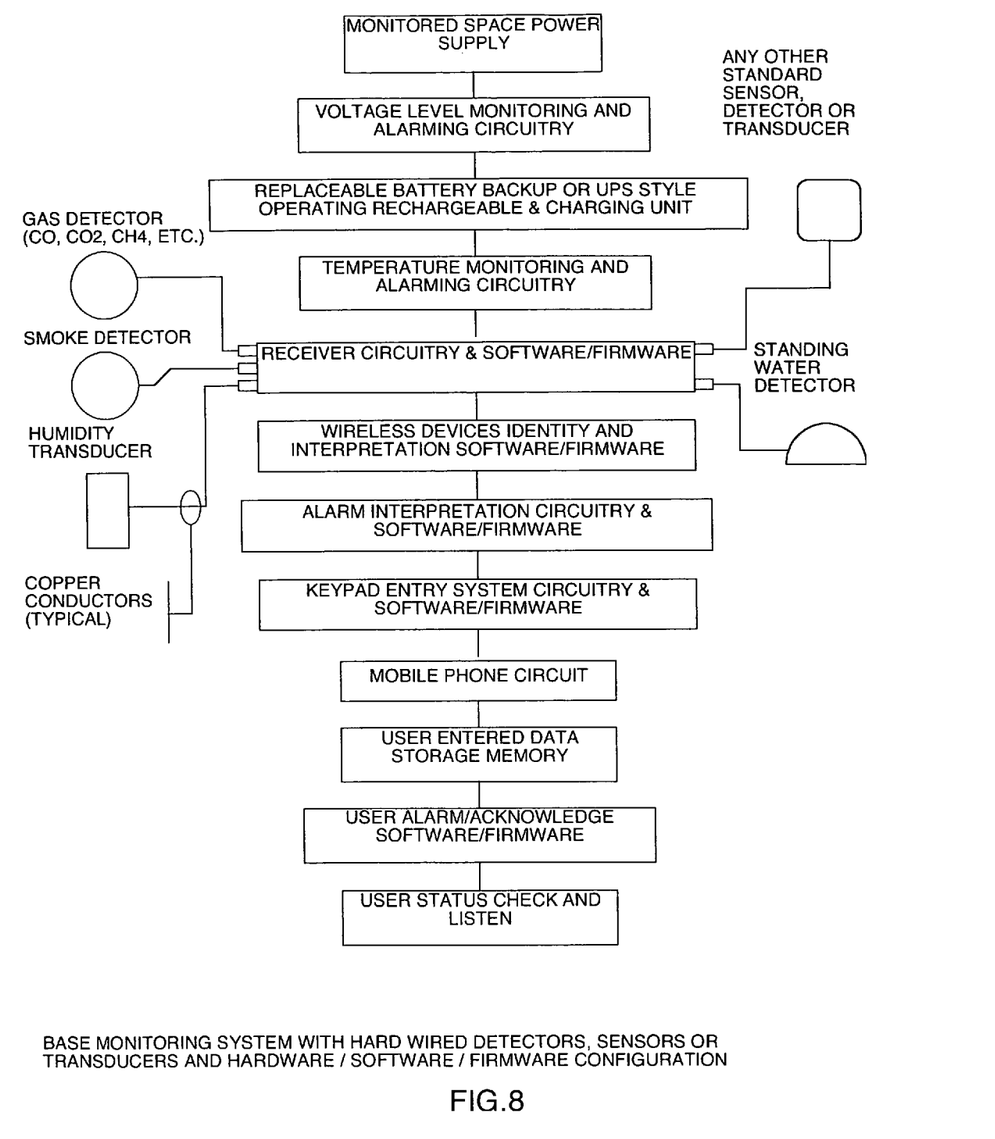
FIG. 8 is a schematic diagram showing the preferred hardware, software and firmware configuration for the basic system with hard-wired detectors, sensors and/or transducers.

Looking next at FIGS. 2 and 8, in another embodiment of the system, hard-wired remote sensors (e.g., temperature, pressure, smoke, humidity, free water, gas sensing, etc.) transmit data to the device using a data plug and trigger alarm conditions in the same manner as the built-in temperature and power sensors discussed above.

System with Ultrasonic Rodent Repellent Module

Figure 9:
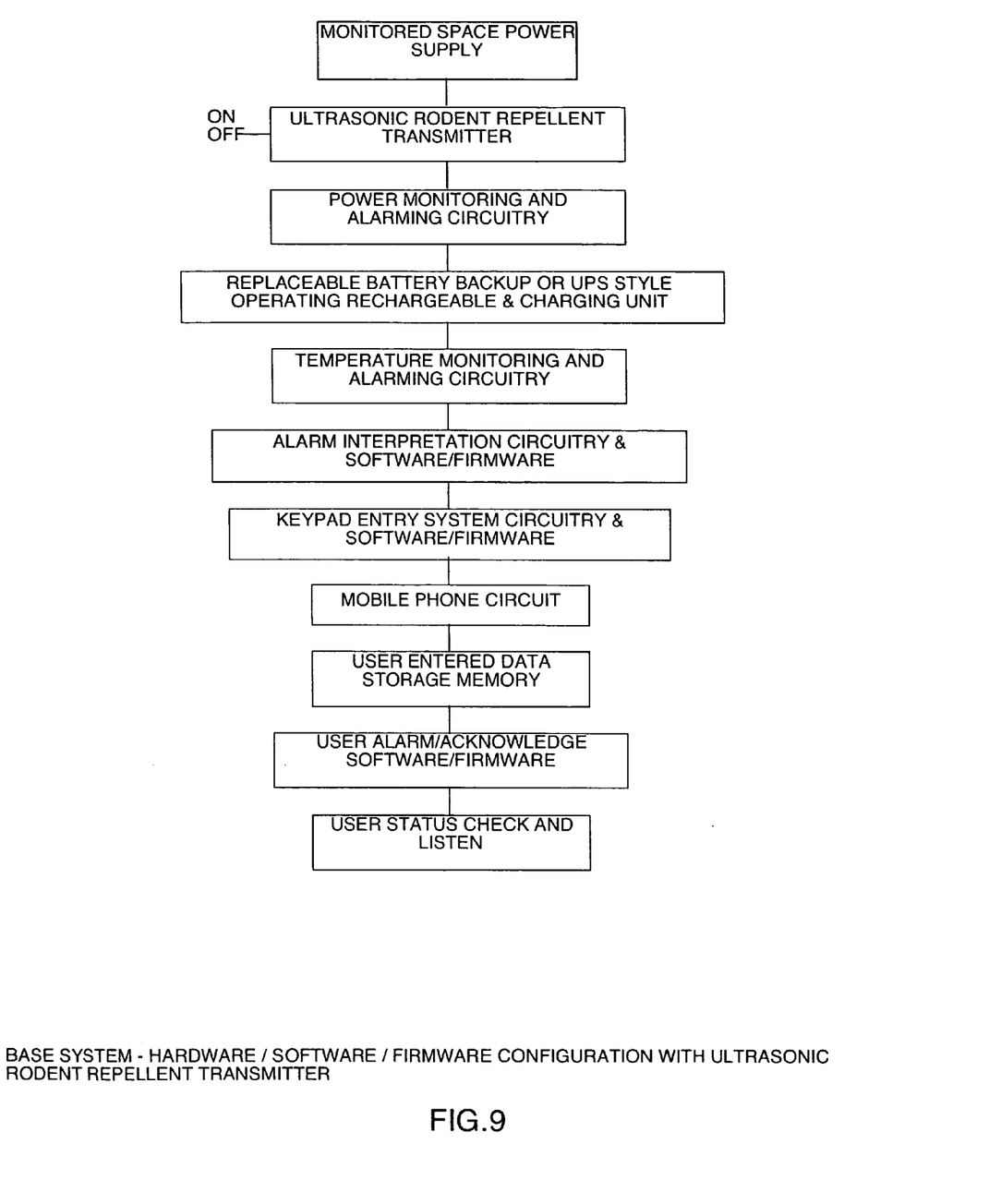
FIG. 9 is a schematic diagram showing the preferred hardware, software and firmware configuration for the basic system with an ultrasonic rodent repellent module.

Looking next at FIGS. 2 and 9, in another embodiment of the system, the device is equipped with a switchable ultrasonic transmitter to repel rodents.

System with Remote Control

In one preferred form of the present invention, the system may include a remote control adapted to control the utilities for the monitored space.

In the case of a rental property or vacation home, the present invention preferably can be remotely accessed to lower temperature in a space when unoccupied to reduce energy costs, and raise the temperature in a space so that occupants can arrive to a comfortable home.

The remote control may also control an electric water shut-off valve at a main water feed which provides means for preventing water damage by shutting the water system down automatically when a leak is detected or when the temperature in the space becomes dangerously low.

Combined System

In another embodiment of the present invention, some or all of the foregoing versions may be combined together in any combination.

Further Modifications

It will be appreciated that still further embodiments of the present invention will be apparent to those skilled in the art in view of the present disclosure.

Thus, for example, the system might be adapted to use a non-rechargeable battery if desired.

It is to be understood that the present invention is by no means limited to the particular constructions herein disclosed and/or shown in the drawings, but also comprises any modifications or equivalents within the scope of the invention.

What is claimed is:

1. A novel system for monitoring temperature and utility power status with respect to a space and alerting a user when an alarm condition occurs, the system comprising:
a housing;
an electrical bus attached to the housing;
a connector module attached to the housing for connecting the electrical bus to a power source;
a battery module attached to the housing and connected to the electrical bus so as to provide power to the electrical bus when the power source is not supplying power to the electrical bus;
a sensor module attached to the housing and powered from the electrical bus for monitoring temperature and utility power status with respect to the space and detecting an alarm condition;
a user interface module attached to the housing and powered from the electrical bus for permitting a user to (i) store at least one telephone number, and (ii) store the current location of the system; and
a cellular telephone module attached to the housing and powered from the electrical bus and configured to (i) place a cellular telephone call to a stored telephone number when the alarm condition is detected by a sensor, and (ii) advise the call recipient of the current location of the system.

2. A system according to claim 1 wherein the battery module contains a rechargeable battery.

3. A system according to claim 2 wherein the rechargeable battery draws power when needed from the electrical bus when the power source is supplying power to the electrical bus.

4. A system according to claim 1 wherein the cellular telephone module is further configured to place a cellular telephone call to a stored telephone number to report the daily operational status.

5. A system according to claim 1 wherein the cellular telephone module is configured to receive an acknowledging telephone call in response to a placed telephone call.

6. A system according to claim 5 wherein the user interface module is configured to store a plurality of telephone numbers, and further wherein the cellular telephone module is configured to call a subsequent telephone number if an acknowledging telephone call is not received in response to a placed telephone call.

7. A system according to claim 1 wherein an alarm condition comprises a failure of the power source.

8. A system according to claim 1 wherein an alarm condition occurs when the temperature is outside a certain range.

9. A system according to claim 1 wherein the sensor module also monitors motion.

10. A system according to claim 1 wherein the system further comprises a camera module which is activated upon the detection of motion.

11. A system according to claim 1 wherein the sensor module is also adapted to monitor at least one from the group consisting of: pressure, smoke, humidity, free water and gas.

12. A system according to claim 11 wherein the system further comprises at least one external sensor module, wherein the at least one external sensor module is connected to the remainder of the system by a wireless interface.

13. A system according to claim 11 wherein the system further comprises at least one external sensor module, wherein the at least one external sensor module is connected to the remainder of the system by a hard-wired interface.

14. A system according to claim 1 wherein the system further comprises a rodent repellent module.

15. A method for monitoring temperature and utility power status with respect to a space and alerting a user when an alarm condition occurs, the method comprising:
providing a system comprising:
a housing;
an electrical bus attached to the housing;
a connector module attached to the housing for connecting the electrical bus to a power source;
a battery module attached to the housing and connected to the electrical bus so as to provide power to the electrical bus when the power source is not supplying power to the electrical bus;
a sensor module attached to the housing and powered from the electrical bus for monitoring temperature and utility power status with respect to the space and detecting an alarm condition;
a user interface module attached to the housing and powered from the electrical bus for permitting a user to (i) store at least one telephone number, and (ii) store the current location of the system; and
a cellular telephone module attached to the housing and powered from the electrical bus and configured to (i) place a cellular telephone call to a stored telephone number when the alarm condition is detected by a sensor, and (ii) advise the call recipient of the current location of the system;
connecting the connector module to a power source; and
using the user interface module to store a telephone number, and using the user interface module to store the current location of the system.

16. A method according to claim 15 wherein the cellular telephone module is configured to receive an acknowledging telephone call in response to a placed telephone call.

17. A method according to claim 16 wherein the user interface module is configured to store a plurality of telephone numbers, and further wherein the cellular telephone module is configured to call a subsequent telephone number if an acknowledging telephone call is not received in response to a placed telephone call.

18. A method according to claim 15 wherein an alarm condition comprises a failure of the power source.

19. A method according to claim 15 wherein an alarm condition occurs when the temperature is outside a certain range.

20. A method according to claim 15 wherein the sensor module also monitors motion.

21. A method according to claim 15 wherein the system further comprises a camera module which is activated upon the detection of motion.

22. A method according to claim 15 wherein the sensor module is also adapted to monitor at least one from the group consisting of: pressure, smoke, humidity, free water and gas.

23. A method according to claim 22 wherein the system further comprises at least one external sensor module, wherein the at least one external sensor module is connected to the remainder of the system by a wireless interface.

24. A method according to claim 22 wherein the system further comprises at least one external sensor module, wherein the at least one external sensor module is connected to the remainder of the system by a hard-wired interface.

25. A method according to claim 15 wherein the system further comprises a rodent repellent module.

26. A method according to claim 15 wherein the battery module contains a rechargeable battery.

27. A method according to claim 26 wherein the rechargeable battery draws power when needed from the electrical bus when the power source is supplying power to the electrical bus.

* * * * *